United States Patent Office 3,441,537
Patented Apr. 29, 1969

3,441,537
ORGANOPOLYSILOXANES
Guenther Fritz Lengnick, Manitou Beach, Mich., assignor to Stauffer Chemical Company, New York, N.Y., a corporation of Delaware
No Drawing. Filed July 12, 1967, Ser. No. 652,672
Int. Cl. C08g 31/28, 33/10
U.S. Cl. 260—46.5                 25 Claims

ABSTRACT OF THE DISCLOSURE

The invention relates to curable one-component organophosphatosiloxanes and to the preparation of these room temperature curing systems by reacting organophosphatosilanes with hydroxyl terminated organopolysiloxanes.

---

The present invention relates to siloxane compositions, particularly to liquid or viscous organopolysiloxanes which may be cured by atmospheric moisture at room temperature to form elastomeric materials.

The desirability of having one-component siloxane compositions which cure at room temperature is well established. Heretofore, certain fluid organopolysiloxanes containing silicon-bonded acyloxy radicals as the reactive groups were stable in the absence of moisture, but cured in the presence of moisture to resinous or elastomeric solids depending on the organopolysiloxane structure and composition. The curing of this one-component system is accompanied by the evolution of a carboxylic acid, generally acetic acid with present commercial materials. This one-component system has been a great commercial success. However, there are some applications in which the presence of the carboxylic acid produced by this system is undesirable and detrimental. The preparation of a commercially acceptable product having desirable properties and universal application is extremely important.

Consequently, the discovery of a new class of organopolysiloxanes has made possible the preparation of a new one-component room temperature curing system. The characteristics of the final cured product can be widely varied by variation in the composition. For example, the newly discovered organopolysiloxanes have improved properties, such as low modulus values. These properties are extremely important, especially where the composition is used in caulking applications. In addition, the corrosive problems which heretofore have plagued the silicone industry have been alleviated by these newly discovered organopolysiloxanes.

It is therefore an object of this invention to provide a novel organopolysiloxane. Another object of this invention is to provide an organopolysiloxane composition which will cure at room temperature. Still another object of this invention is to provide an organopolysiloxane composition which will be less toxic than the ones heretofore known in the art. Still another object of this invention is to provide an organopolysiloxane composition which will be essentially non-corrosive to a metal substrate. A further object of this invention is to provide an organopolysiloxane composition which will rapidly cure to an elastomeric state. A still further object of this invention is to provide an organopolysiloxane composition which may be dispensed in a single packaged system.

The foregoing objects and others which will become apparent from the following description are accomplished in accordance with this invention, generally speaking, by providing organopolysiloxane compositions having the following formulae:

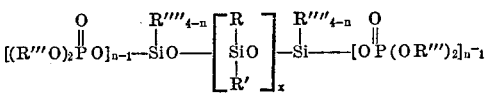

or

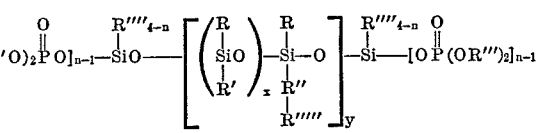

wherein R and R', which may be the same or different, represent monovalent hydrocarbon radicals, halogenated monovalent radicals or cyanoalkyl radicals; R'' is a divalent hydrocarbon radical, halogenated divalent radical or divalent cyanoalkyl radical; R''' is a monovalent hydrocarbon radical, halogenated monovalent hydrocarbon radical or cyanoalkyl radical; R'''' is hydrogen, a monovalent hydrocarbon radical, halogenated monovalent hydrocarbon radical, cyanoalkyl radical or radicals hydrolyzed by ambient moisture; R''''' is a monomeric or polymeric organic group linked to R'' by a carbon to carbon linkage; $n$ is an integer greater than 3 and up to 4; $x$ is an integer of from 0 to 20,000 and $y$ is an integer of from 1 to 500.

The phosphorus containing organopolysiloxanes illustrated above are prepared by reacting an organophosphatosilane of the formula

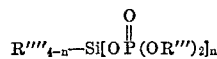

with organopolysiloxanes having the general formulae:

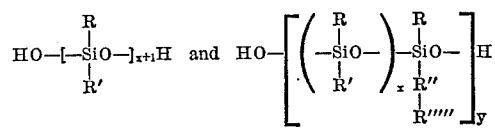

wherein R, R', R'', R''', R'''', R''''', $x$ and $y$ are the same as those represented above. R, R' and R'''' are organic radicals selected from the class consisting of alkyl radicals having from 1 to 18 carbon atoms such as methyl, ethyl, propyl, butyl, hexyl, octyl, decyl, dodecyl, tetradecyl, octadecyl; aryl radicals such as phenyl, diphenyl, naphthyl and the like; alkaryl radicals such as tolyl, xylyl, ethylphenyl and the like; aralkyl radicals such as benzyl, phenylethyl and the like; haloaryl radicals such as chlorophenyl, tetrachlorophenyl, difluorophenyl and the like; alkenyl radicals such as vinyl, allyl and the like. R'''' may also represent hydrolyzable groups such as carboxy, hydrocarbonoxy, aminooxy and oximo groups. Examples of carboxy groups are monoacyl radicals of carboxylic acids such as formoxyl, acetoxyl, propionoxyl, valeroxyl, caproxyl, myristoxyl and stearoxyl radicals. Other hydrolyzable groups are hydrocarbonoxy groups having from 1 to 10 carbon atoms such as methoxy, ethoxy, butoxy, heptoxy, octoxy, decoxy, phenoxy and the like; aminooxy groups such as dimethylaminooxy, diethylaminooxy, dipropylaminooxy, dibutylaminooxy, dioctylaminooxy, diphenylaminooxy, ethylmethylaminooxy, methylphenylaminooxy and the like. Other groups are the oximo radicals such as acetophenoximo acetonoximo, benzophenoximo, 2-butanoximo, diisopropylketonoximo, chlorocyclohexanoximo, alpha-bromoacetophenoximo and the like. R'' is a divalent radical such as methylene, ethylene propylene, butylene, hexylene, octylene, decylene, dodecylene, phenylene and the like. The groups represented by R'''' are monomers, polymers or copolymers which are linked to a hydroxyl terminated organopolysiloxane backbone through a carbon to carbon linkage with an alkylene or arylene group represented by R'' above.

Examples of suitable phosphatosilanes which may be reacted with the hydroxyl terminated organopolysiloxanes are
methyl-tris(dimethylphosphato)silane,
ethyl-tris(dimethylphosphato)silane,
propyl-tris(dimethylphosphato)silane,
butyl-tris(dimethylphosphato)silane,
hexyl-tris(dimethylphosphato)silane,
octyltris(dimethylphosphato)silane,
dodecyl-tris(dimethylphosphato)silane,
hexadecyl-tris(dimethylphosphato)silane,
octadecyl-tris(dimethylphosphato)silane,
methyl-tris(diethylphosphato)silane,
ethyl-tris(dipropylphosphato)silane,
propyl-tris(dibutylphosphato)silane,
methyl-tris(dihexylphosphato) silane,
hexyl-tris(ditetradecylphosphato)silane,
octyl-tris(dioctadecylphosphato)silane,
methyl-tris(dihexylphosphato)silane,
methyl-tris(ethylpropylphosphato)silane,
butyl-tris(methylhexylphosphato)silane,
propyl-tris(methyldodecylphosphato)silane,
hexyl-tris(methyloctadecylphosphato)silane,
octyl-tris(ethyltetradecylphosphato)silane,
phenyl-tris(diphenylphosphato)silane,
tolyl-tris(diphenylphosphato)silane,
naphthyl-tris(diphenylphosphato)silane,
methyl-tris(diphenylphosphato)silane,
octyl-tris(diphenylphosphato)silane,
phenyl-tris(methylphenylphosphato)silane,
propyl-tris(butylphenylphosphato)silane and the like.

Examples of other phosphatosilanes are
tetrakis(dimethylphosphato)silane,
tetrakis(dibutylphosphato)silane,
tetrakis(dihexylphosphato)silane,
tetrakis(dioctylphosphato)silane,
tetrakis(didodecylphosphato)silane,
tetrakis(dioctadecylphosphato)silane,
tetrakis(methyloctylphosphato)silane,
tetrakis(methylethylphosphato)silane,
tetrakis(ethylbutylphosphato)silane,
tetrakis(propylbutylphosphato)silane,
tetrakis(butylhexylphosphato)silane,
tetrakis(octadecylphosphato)silane,
tetrakis(dodecyloctadecylphosphato)silane,
tetrakis(diphenylphosphato)silane,
tetrakis(dinaphthylphosphato)silane,
tetrakis(methylphenylphosphato)silane,
tetrakis(methyltolylphosphato)silane,
tetrakis(propylxylylphosphato) silane and the like.

These phosphorus compounds may be prepared by reacting dialkyl or diaryl hydrogen phosphates or mixtures thereof with organotrihalosilanes in the presence of a solvent at a temperature of from about 25° to 150° C., preferably from about 80° to 120° C. For example, diethylhydrogen phosphate may be reacted with an alkyltrihalosilane such as methyltrichlorosilane in the presence of a solvent and an acid acceptor. Acid acceptors such as alkylamines or pyridine are preferably used in the formation of these phosphatosilane compounds.

Also, these phosphato compounds may be prepared by reacting alkali metal or alkaline earth metal salts of an organic phosphate with an organohalosilane in accordance with the following equation:

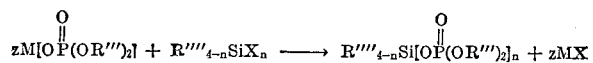

wherein R''' and R'''' are the same as those described above, X is a halogen, M is an alkali metal or alkaline earth metal and z is an integer greater than 2 and up to 4.

If desired, the formation of the phosphatosilanes may be carried out in the presence of an inert solvent. Suitable solvents include aliphatic hydrocarbons such as pentane, hexane, heptane, octane; aromatic hydrocarbons such as benzene, toluene, xylene, naphthylene, as well as halogenated solvents such as methylene chloride, chlorobenzene and the like. Other solvents which may be employed are organic ethers such as petroleum ethers, diethyl ether, dibutyl ether and fluid hydroxyl-free siloxanes.

The conventional organopolysiloxanes described heretofore may be prepared from any di-functional organosilanes of the formula

wherein R and R' represent an unhalogenated or halogen monovalent aliphatic, alicyclic or aromatic hydrocarbon radical such as methyl, ethyl, vinyl, allyl, cyclohexyl, cyclohexenyl, phenyl and tolyl and X represents a hydrolyzable atom or group such as a halogen atom or an alkoxy group. The diorganopolysiloxanes may be homopolymers as well as copolymers, that is, compounds derived from two or more different diorganosilanes and even the organic radicals linked to any particular silicon atom may be different organic radicals. Especially useful are the dimethylpolysiloxanes, the methylphenylpolysiloxanes and the methylvinylpolysiloxanes.

In the formation of the grafted organopolysiloxanes, the monomeric or polymeric groups are grafted to the conventional hydroxyl terminated organopolysiloxanes by using a free-radical initiator, normally a peroxide. As little as 0.05 percent of the more active peroxide initiators based on the weight of reactants is adequate in most cases. Where increased reaction rates are desired as much as 2 percent or even more of the initiator may be used. In general, it is advised not to exceed about 1 percent, since higher concentrations tend to promote coupling reactions which understandably increase the viscosity of the reaction mixture.

In using a free-radical initiator, the reaction when carried out in a batch-wise process generally proceeds at a satisfactory rate if a temperature is maintained in a range of from about 60° C. to 130° C. If a continuous process is used or if the reaction is carried out batch-wise without a free-radical initiator, substantially higher temperatures such as up to about 160° C. may be advantageously employed.

Examples of suitable peroxide initiators are those having at least one of the peroxide oxygens attached to a tertiary-carbon atom such as dialkyl peroxides, i.e., ditert-butyl and dicumyl peroxide; hydroperoxides such as tert-butyl hydroperoxide, cumyl hydroperoxide and decylene hydroperoxides; cyclic peroxides such as ascaridole and 1,5-dimethylhexane-1,5-peroxide; and peresters such as tert-butylperbenzoate, tert-butylperoxyisopropylcarbonate and tert-butylperoctoate. Other peroxides which may be used are ketone peroxides such as acetone peroxide and cyclic hexanone peroxide.

Acyl peroxides and peracids may be used as initiators in the formation of graft polymers. However, these initiators result in less grafting, i.e., lower yields of the grafted product. The difference is believed to lie in the nature of the radicals produced, thus tert-alkoxy radicals from ditert-butyl peroxide, for example, have a strong tendency to extract hydrogen atoms which is a necessary step in the grafting procedure. On the other hand, acyloxy radicals produced from acyl peroxide, e.g., benzyl peroxide while effective initiators are relative ineffective as hydrogen extractors.

Although it may be possible to carry out the grafting procedure using organopolysiloxane material free of terminal hydroxyl groups or groups hydrolyzable by ambient moisture and to subsequently treat the graft polymer to incorporate such groups, it is preferred in the grafting operation to start with an organopolysiloxane having terminal hydroxyl groups. Following this procedure, the grafted polymer is appropriately treated to convert the hydroxyl groups to groups which are hydrolyzable by ambient moisture.

The hydroxyl terminated organopolysiloxanes may contain in minor proportions molecules having only one hydroxyl group or there may be a smaller number of molecules carrying an excess of two hydroxy groups. It is preferred, in any event, that the hydroxyl terminated organopolysiloxanes have on the average from about 1.75 to about 2.25 hydroxyl groups per molecule.

The proportion of organic monomer or polymer used in the grafting reaction may be varied within wide limits; however, it has been found that greatly improved physical properties have been obtained when the reaction mixture contains from about 25 to about 75 percent by weight of organic monomers or polymers. It is preferred that the organic monomer or polymer portion account for from about 40 to 65 percent of the total weight of the reactants.

Organic monomeric compounds which may be used in the formation of the grafted organopolysiloxanes include both branched and straight chained monomeric olefins having from 1 to 18 carbon atoms such as ethylene, propylene, butylene, isobutylene, isoprene, butadiene, hexylene, octylene, 1-decene, dodecene, tetradecene, hexadecene, octadecene; unsaturated aromatic hydrocarbons such as styrene, alpha-methylstyrene, alpha-ethylstyrene, alpha-butylstyrene, vinyl toluene and the like. Other monomeric compounds which may be used are the halogenated mono-olefinic hydrocarbons such as chloroprene, chlorostyrene, alpha-bromostyrene, 2,5-dichlorostyrene, 2,5 - dibromostyrene, 3,4-dichlorostyrene, 3,4-difluorostyrene, ortho-, meta- and para-fluorostyrenes, 2,6-dichlorostyrene, 2,6-difluorostyrene, 3-chloro-4-fluorostyrene, 2,4,5-trichlorostyrene, dichloro-mono-fluorostyrene, chloroethylene, 1,1-dichloroethylene, phenylethylene, fluoroethylene, iodoethylene, 1,1-dibromoethylene, 1,1-difluoroethylene, 1,1-diiodoethylene and the like. Examples of unsaturated acids which may be used are vinyl acetic acid, acrylic acid, methacrylic acid, crotonic acid, 3-butenoic acid, cinnamic acid, maleic acid, trimethyl maleic acid, lauric acid, oleic acid, linoleic acid, lenolenic acid and the like. Other compounds which may be used are esters of organic acids such as vinyl acetate, vinyl propionate, vinyl butyrate, vinyl isobutyrate, vinyl valerate, vinyl caproate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate and dodecyl acrylate, tetra-decyl acrylate, octodecyl acrylate, isopropenyl acetate, isopropenyl propionate, isopropenyl butyrate, isopropenyl isobutyrate, isopropenyl valerate, isoropenyl caproate, isopropenyl benzoate, isopropenyl p-chlorobenzoate, isopropenyl o-bromobenzoate, isopropenyl m-chlorobenzoate, isopropenyl toluate, isopropenyl alpha-chloroacetate, isopropenyl alpha-bromopropionate, vinyl alpha-chloroacetate, vinyl alpha-bromoacetate, vinyl alpha-chloropropionate, vinyl alpha-bromopropionate, vinyl alpha-iodopropionate, vinyl alha-chlorobutyrate, vinyl alpha-chlorovalerate, vinyl alpha-bromovalerate, allyl chlorocarbonate, allyl formate, allyl acetate, allyl propionate, allyl butyrate, allyl valerate, allyl caproate, diallyl phthalate, diallyl succinate, diethylene glycol bis-(allyl carbonate), allyl-3,5-5-trimethylhexoate, diallyl adipate, diallyl subacate, diallyl fumarate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl aceto acetate, allyl thioacetate, as well as methyl esters corresponding to the above allyl esters. Other vinyl compounds which may be used are the vinyl aromatics such as vinyl pyridine, vinyl naphthalene, divinyl benzene, as well as vinyl silicone compounds such as vinyl triethoxysilanes.

In addition, organic nitriles such as acrylonitrile, methacrylonitrile, ethacrylonitrile, crotonitrile and the like may be used in the formation of grafted polysiloxanes.

As emphasized previously, the monomers may be used singly or in combinations of two or three or even more. Exceptional results have been achieved by the use of styrene and substituted styrenes in conjunction with acrylates and methacrylates.

For purposes of this invention, the organopolysiloxanes and the organopolysiloxanes having organic groups grafted thereto are generally liquids having a viscosity of from about 1,000 to about 500,000 centistokes at 25° C., preferably from about 2,000 to about 100,000 centistokes.

The reaction between the phosphatosilanes and the organopolysiloxanes may be carried out at any convenient temperature although, in general, temperatures ranging from about 20° C. to 100° C. are sufficient. It should be understood, of course, that higher or lower temperatures can be employed if desired although, preferably the reaction should be carried out at temperatures below about 200° C.

If desired, the reaction may be carried out in the presence of an inert solvent, that is, a solvent which will not react with the terminal hydroxyl groups on the organopolysiloxane. Solvents which may be used include hydrocarbons such as benzene, toluene, xylene; petroleum ethers; halogenated solvents such as ethylene chloride, perchloroethylene, chlorobenzene and the like; organic ethers such as diethyl ether and dibutyl ether; and fluid hydroxyl-free siloxanes. The presence of solvents are particularly desirable when the hydroxyl terminated organopolysiloxane has a high viscosity. In these cases, the presence of a solvent reduces the overall viscosity of the mixture and facilitates the reaction.

Although the ratio of phosphatosilanes to organopolysiloxanes is not critical, it is preferred that at least one mole of the phosphorus compound be used per mole of silicon bonded hydroxyl group and more preferably from about 2 to 5 moles of the phosphorus compound be used per mole of silicon bonded hydroxyl group in the organopolysiloxane. It is possible to use up to about 12 moles of the phosphorus compound per mole of silicon bonded hydroxyl group in the siloxane. A large excess of the phosphorus compound insures complete reaction with all silicon bonded hydroxyl groups and in addition, acts as a scavenger for any moisture which may be present. It is preferred that the reaction be carried out in the absence of moisture, since the latter may interfere with the reaction. However, traces of moisture are not especially harmful if an excess of the phosphorus compound is used.

The compositions of this invention may be cured by merely exposing them to atmospheric moisture with or without any additional water vapor. Upon exposure to moisture, the compositions cure at times varying from a few minutes to several hours or days depending upon the type of R, R', R''' and R'''' groups. In general, an increase in the molecular weight of any of the groups will increase the time of cure.

The compositions according to the present invention may consist solely of the reaction product of an organopolysiloxane and a phosphatosilane. However, for modifying the consistency of the uncured composition or to reinforce the cured products or for some other purpose, mineral fillers in the form of very fine powders may be added.

Examples of mineral fillers which may be used are various kinds of silicas, oxides of iron, zinc, cadmium, aluminum and carbonates, especially calcium carbonate. The particular filler and proportion in which it is used will depend to a certain extent on the particular use to which the composition is to be applied. Silica obtained by precipitation, for example, those sold under the trade names Santocel and Hi-Sil and silicas obtained by combustion such as those sold under the trade name Aerosil, are particularly suitable for the production of reinforced elastomeric products. These silicas are micro fine products formed of particles having the size of the order of 10 to 20 millimicrons and have a high absorptive power. They have a large absorbent surface and are very effective even in small quantities. Fillers such as milled natural silicas and calcium carbonate can, on the other hand, be employed in larger proportions, for example, 200 percent based on the weight of the organopolysiloxane.

Apart from the fillers mentioned heretofore, compositions conforming to the invention may contain coloring agents, thixotropic agents, agents capable of preventing the passage of ultraviolet light, desiccants and antioxidants.

These compositions may be dissolved or dispersed in organic liquids which are compatible with the organopolysiloxanes. Examples of suitable diluents are aromatic hydrocarbons such as benzene, toluene or xylene; aliphatic hydrocarbons such as hexane and heptane and halogenated aliphatic hydrocarbons such as methylene chloride and the like.

In addition to the constituents mentioned above, the compositions of this invention may contain, for the purpose of accelerating the rate of cure, certain compounds which have a catalytic effect on the condensation reactions. Although several compounds are known which have a catalytic effect upon the curing rate, organotin compounds were found to be the most desirable. Examples of suitable catalysts are the tin salts of organic carboxylic acids such as tin naphthenate, tin 2-ethylhexanate, tin benzoate, dibutyltindilaurate, dibutyltindiacetate and the like. These tin compounds may be used in an amount determined as tin metal of from 0.001 to about 1.0 percent by weight based on the weight of the organopolysiloxanes.

A convenient method for preparing the compositions of this invention comprises mixing liquid hydroxyl terminated organopolysiloxanes and a filler in any conventional mixing apparatus such as a Sigma-Blade mixer, roller mill, Banbury mixer and the like, and thereafter heating the mixture for a sufficient time to eliminate all traces of moisture. Various methods may be used together with the heating to facilitate the elimination of water such as, for example, sweeping with a current of dry inert gas. The mass is then cooled and the phosphorus compound is added and if desired, a catalyst and an anhydrous organic diluent. The composition is then transferred under anhydrous conditions into dry containers which are then hermetically sealed. The products thus prepared may be kept for several months and even several years.

The compositions of this invention are stable in the absence of moisture. Consequently, they can be stored for prolonged periods of time without any deleterious effects. During this period of storage, little or no change occurs in the physical properties of the compositions. This is of particular importance from a commercial standpoint, since it assures that once a composition is prepared with a certain consistency and cure time that neither will change to any great extent upon storage. This stability on storage is the characteristic which makes the composition of this invention particularly useful as one-component room temperature curing compositions.

The products of this invention adhere to a variety of materials such as, for example, wood, metal, glass, ceramics, plastics and the like. In the case of metals, it may be desirable to apply an appropriate pretreatment to the metal before applying the composition of this invention. These self-curing compositions may serve for caulking, covering various articles such as electrical equipment, coating glass, metals, fabrics, protecting various supports and producing films and molded articles. These compositions may be applied by any of the usual techniques such as by dipping, doctoring or spraying.

Various aspects of the invention are further illustrated by the following examples which are not to be taken as in any way limiting the scope thereof. In the examples, all parts are by weight unless otherwise specified.

Preparation of the phosphatosilanes

Example 1

Approximately 18.3 parts of diethyl hydrogen phosphate is added to about 49.4 parts of benzene and introduced to a reactor along with about 5.2 parts of methyltrichlorosilane dissolved in about 12 parts of benzene. The reactants are heated to reflux temperature for about 0.5 hour with agitation. Nitrogen is then passed through the solution for approximately 5 hours and the solvent removed under vacuum distillation at a temperature of about 55° C. yielding a viscous liquid. The product is analyzed and found to be methyltris(diethylphosphato)silane.

Example 2

To a reactor containing about 49.4 parts of benzene and 15.3 parts of diethyl hydrogen phosphate is added a solution containing about 12 parts of benzene, 5.2 parts of methyltrichlorosilane and about 7.8 parts of pyridine with agitation. The reactants are heated to reflux temperature and refluxed for approximately 2 hours and then cooled to room temperature. The pyridine hydrochloride thus formed is removed by filtration and the solvent removed by vacuum distillation. A reaction product is recovered. On analysis, it is determined to be methyltris(diethylphosphato)silane.

Example 3

To a reactor containing 38 parts of benzene and about 110 parts of diethyl hydrogen phosphate is added about 150 parts of benzene and about 38.2 parts of butyltrichlorosilane. The reactants are heated to reflux temperature and refluxed for about 0.5 hour. The solvent is removed by vacuum distillation and a product identified as butyltris(diethylphosphato)silane is recovered.

Example 4

To a reactor containing approximately 405 parts of benzene and 153 parts of diethyl hydrogen phosphate is added about 176 parts of benzene containing about 66 parts of hexyltrichlorosilane and about 78 parts of pyridine. The reactants are heated with agitation to reflux temperature and refluxed for approximately 0.5 hour and then cooled to room temperature. The pyridine hydrochloride thus formed is removed by filtration and the solvent is removed under vacuum distillation. Infrared analysis of the product disclosed no OH groups or a phosphorus to hydrogen group. The product is identified as hexyltris(diethylphosphato)silane.

Example 5

To a reactor containing approximately 80 parts of benzene and 210 parts of dibutyl hydrogen phosphate is added about 40 parts of benzene containing about 57.5 parts of butyltrichlorosilane and about 80 parts of pyridine. The reactants are heated to reflux temperature and maintained at this temperature for approximately 2 hours and then cooled to room temperature. The pyridine hydrochloride thus formed is removed by filtration and the solvent is removed by vacuum distillation at a temperature of about 60° C. A product is recovered which is identified as butyltris(dibutylphosphato)silane.

Example 6

Approximately 80 parts of benzene containing 83 parts of decyltrichlorosilane is added to a reactor containing about 140 parts of benzene and 266 parts of dihexyl hydrogen phosphate. Approximately 80 parts of pyridine are then added to the reactor with agitation and heated to reflux temperature. The reactants are refluxed for approximately 2 hours and then cooled to room temperature. The pyridine hydrochloride thus formed is removed by filtration and the solvent removed by vacuum distillation. The recovered product is analyzed and identified as decyltris(dihexylphosphate)silane.

Example 7

To a reactor containing approximately 160 parts of benzene and 430 parts of didodecyl hydrogen phosphate and about 80 parts of pyridine is added a solution containing about 40 parts of benzene and about 108 parts of hexadecyltrichlorosilane over a period of about 23 minutes with agitation. The reactants are heated to reflux temperature and refluxed over a period of about 2 hours and then cooled to room temperature. The pyridine hydrochloride thus formed is removed by filtration and the solvent removed under vacuum at a temperature of about 60° C. The product is analyzed and identified as hexadecyltris(didodecylphosphato)silane.

Example 8

In accordance with the procedure described in Example 5, approximately 250 parts of diphenyl hydrogen phosphate is reacted with about 45 parts of methyltrichlorosilane in about 120 parts of benzene and about 80 parts of pyridine. A product is recovered which is identified as methyltris(diphenylphosphato)silane.

Example 9

In accordance with the procedure described in Example 5, approximately 250 parts of diphenyl hydrogen phosphate is reacted with about 83 parts of decyltrichlorosilane in about 120 parts of benzene and about 80 parts of pyridine. A product is recovered which is identified as decyltris(diphenylphosphato)silane.

Example 10

In accordance with the procedure described in Example 5, approximately 278 parts of dibenzyl hydrogen phosphate is reacted with about 63.3 parts of phenyltrichlorosilane in about 120 parts of benzene and about 80 parts of pyridine. A product is recovered which is identified as phenyltris(dibenzylphosphato)silane.

Example 11

In accordance with the procedure described in Example 5, approximately 306 parts of diphenylethyl hydrogen phosphate is reacted with about 78 parts of naphthyltrichlorosilane in about 220 parts of benzene and about 80 parts of pyridine. A product is recovered which is identified as naphthyltris(diphenylethylphosphato)silane.

Example 12

To a reactor containing approximately 60 parts of benzene and about 154 parts of diethyl hydrogen phosphate is added a complex formed by the reaction of about 34 parts of tetrachlorosilane and about 70 parts of pyridine in about 88 parts of benzene. The reactants are heated to reflux temperature and refluxed for a period of about 2 hours and then cooled to room temperature. The pyridine hydrochloride thus formed is removed by filtration and the solvent is removed by vacuum distillation at a temperature of about 60° C. A viscous product is recovered which is identified as tetrakis(diethylphosphato)silane.

Example 13

In accordance with the procedure described in Example 8, approximately 210 parts of dibutyl hydrogen phosphate is reacted with about 34 parts of tetrachlorosilane in about 100 parts of benzene and about 80 parts of pyridine. A product is recovered which is identified as tetrakis(dibutylphosphato)silane.

Example 14

In accordance with the procedure described in Example 13, 602 parts of dioctadecyl hydrogen phosphate is substituted for the dibutyl hydrogen phosphate. A product is recovered which is identified as tetrakis(dioctyldecylphosphato)silane.

Example 15

In accordance with the procedure described in Example 5, approximately 210 parts of dibutyl hydrogen phosphate is reacted with about 49.5 parts of methoxytrichlorosilane in about 200 parts of benzene and about 80 parts of pyridine. A product is recovered which is identified as methoxytris(dibutylphosphato)silane.

Example 16

In accordance with the procedure described in Example 5, approximately 378 parts of didecyl hydrogen phosphate is reacted with about 62.1 parts of butoxytrichlorosilane in about 200 parts of benzene and about 80 parts of pyridine. A product is recovered which is identified as butoxytris(didecylphosphato)silane.

Example 17

In accordance with the procedure described in Example 5, approximately 250 parts of diphenyl hydrogen phosphate is reacted with about 68.1 parts of phenoxytrichlorosilane in about 200 parts of benzene and about 80 parts of pyridine. A product is recovered which is identified as phenoxytris(diphenylphosphato)silane.

Preparation of grafted organopolysiloxanes

Example 18

Grafted organopolysiloxanes are prepared by grafting olefinic compounds to hydroxyl terminated polysiloxanes by reacting a mixture consisting of polydimethylsiloxanes and olefinic compounds in the presence of a free-radical initiator at a temperature of from about 60° to about 190° C. The unreacted olefinic compounds are removed at an elevated temperature by applying a vacuum of about 1 mm. or less while continuing to heat and stir for an additional hour. The pertinent data is illustrated in Table I.

TABLE I

| Example No. | Olefinic compound | | Hydroxylated fluid | | Free-radical initiator | | Reaction conditions | | Final polymer viscosity, cs. |
|---|---|---|---|---|---|---|---|---|---|
| | Type | Parts | Viscosity, cs. | Parts | Type | Parts | Temp., °C. | Time, hr. | |
| 18(a) | Acrylonitrile | 14.6 | 1,900 | 50 | t-BP | 0.5 | 80 | 1.5 | 14,000 |
| | Butyl acrylate | 35.4 | | | | | | | |
| 18(b) | Acrylonitrile | 9.0 | 800 | 40 | t-BP | 0.5 | 80 | 1.7 | 7,800 |
| | Butyl acrylate | 51.0 | | | | | | | |
| 18(c) | Acrylonitrile | 9.1 | 800 | 40 | t-BP | 0.25 | 80 | 2.0 | 20,200 |
| | Ethyl acrylate | 2.9 | | | | | | | |
| | Butyl acrylate | 48.0 | | | | | | | |
| 18(d) | Methacrylate | 50.0 | 400 | 50 | t-BP | 0.5 | 80 | 4.0 | 15,500 |
| 18(e) | Lauryl methacrylate | 70.0 | 400 | 30 | t-BP | 0.5 | 80 | 5.0 | 19,400 |
| 18(f) | Styrene | 250.0 | 610 | 304 | t-BP | 2.0 | 125 | 24.0 | 14,500 |
| | Butyl acrylate | 204.0 | | | | | | | |
| 18(g) | Vinyl chloride | 45.0 | 6,700 | 350 | t-BPer | 1.8 | 80 | 4.0 | 17,800 | t-BP=tertiary butyl peroxide.  t-BPer=tertiary butyl peroctoate.

Preparation of phosphatopolysiloxanes

Example 19

A reactor containing approximately 31.3 parts of a grated hydroxyl terminated organopolysiloxane prepared in accordance with the procedure described in Example 18(a) is evacuated for about 10 minutes. About 3 parts of methyltris(diethylphosphato)silane prepared in accordance with the procedure described in Example 1 is added to the reactor and heated to a temperature of about 80° with agitation. After about 1 hour, the volatile materials are removed by vacuum distillation and the residual product placed in a mold and allowed to cure at room temperature. It cured to a tack-free condition in less than about 6 hours yielding a cloudy, opaque elastomeric solid.

Example 20

To a reactor containing approximately 31.3 parts of a hydroxyl terminated organopolysiloxane having a viscosity of about 10,000 cs. is added about 3 parts of butyltris(diethylphosphato)silane prepared in accordance with the procedure described in Example 3. The reactants are heated to a temperature of about 80° C. for about 1 hour with agitation. The volatile materials are removed under vacuum and the residual product is transferred to a mold and allowed to cure at room temperature. The product cured to a tack-free state in less than 6 hours.

Example 21

To a reactor containing about 33.3 parts of a hydroxyl terminated organopolysiloxane (viscosity 16,000 cs.) is added about 2 parts of methyltris(diethylphosphato)silane prepared in accordance with the procedure described in Example 2. The reactants are heated to a temperature of about 80° C. for about 1 hour with agitation. The volatile materials then are removed under vacuum distillation. The residual product cures at room temperature when exposed to ambient moisture, to a tack-free condition in less than about 2 hours.

Example 22

To a reactor containing approximately 33.3 parts of a hydroxyl terminated organopolysiloxane prepared in accordance with the procedure described in Example 18(b) is added about 3 parts of hexyltris(diethylphosphato)silane prepared in accordance with the procedure described in Example 4. The reactants are heated to a temperature of about 80° C. for a period of about 1 hour with agitation. The volatile materials are removed under vacuum and the resulting product is placed in a mold and allowed to cure at room temperature in the presence of ambient moisture. The transparent product is tack-free in about 34 minutes.

Example 23

To a reactor containing about 33.3 parts of hydroxyl terminated organopolysiloxane (viscosity 18,000 cs.) is added about 2 parts of decyltris(dihexylphosphato)silane with agitation. After heating the reactants to a temperature of about 80° C. for 1 hour, the volatile materials are removed under vacuum. The residual product is placed in a mold and allowed to cure at room temperature in the presence of ambient moisture. The product is tack-free in about 4.2 hours.

Example 24

To a reactor containing approximately 33.3 parts of a hydroxyl terminated organopolysiloxane prepared in accordance with the procedure described in Example 18(c) is added about 2 parts of methyltris(diphenylphosphato)silane with agitation. The reactants are heated to a temperature of about 80° C. for about 1 hour with agitation. The volatile materials are removed under vacuum and the residual product is cured to a tack-free condition in about 3 hours at room temperature in the presence of ambient moisture.

Example 25

Approximately 33.3 parts of a hydroxyl terminated organopolysiloxane having a viscosity of about 4,000 cs. is added to a reactor. Approximately 2 parts of decyltris(diphenylphosphato)silane prepared in accordance with the procedure described in Example 9 is added to the reactor with agitation and heated to about 80° C. for a period of about 1 hour. The volatile materials are removed under vacuum. The resulting product cures to a tack-free condition in less than about 6 hours when exposed to ambient moisture.

Example 26

To a reactor containing about 33.3 part of a hydroxyl terminated organopolysiloxane prepared in accordance with the procedure described in Example 18(d) is added about 1 part of a tetrakis(diethylphosphato)silane with agitation. The reactants are heated to a temperature of about 80° C. for a period of about 1 hour. After removing the volatile materials under vacuum, the residual product cures to a tack-free condition in about .3 hour upon exposure to ambient moisture.

Example 27

In accordance with the procedure described in Example 20, 3 parts of phenyltris(o-ditolylphosphato)silane is substituted for butyltris(diethylphosphato) silane. The product cured to a tack-free condition when exposed to ambient moisture.

Example 28

In accordance with the procedure described in Example 20, 3 parts of hydrogen tris(diphenylphosphato)silane is substituted for butyltris(diethylphosphato)silane. A tack-free product is obtained when exposed to ambient moisture.

Example 29

In accordance with the procedure described in Example 20, 3 parts of tetrakis(dibutylphosphato)silane is substituted for methyltris(diethylphosphato)silane. The product cured to a tack-free condition when exposed to ambient moisture.

Example 30

In accordance with the procedure described in Example 20, 3 parts of tetrakis(dioctadecylphosphato)silane is substituted for butyltris(diethylphosphato)silane. The product cured to a tack-free condition when exposed to ambient moisture.

Example 31

In accordance with the procedure described in Example 19, 31.3 parts of a grafted hydroxyl terminated organopolysiloxane prepared according to Example 18(e) is reacted with about 3 parts of methoxytris(dibutylphosphato)silane. A tack-free product is obtained upon exposure to ambient moisture.

Example 32

In accordance with the procedure described in Example 20, 3 parts of butoxytris(didecylphosphate)silane is substituted for butyltris(diethylphosphato)silane. Exposure to ambient moisture resulted in a tack-free product.

Example 33

In accordance with the procedure described in Example 19, 31.3 parts of a grafted hydroxyl terminated organopolysiloxane prepared according to Example 18(f) is reacted with about 3 parts of phenoxytris(diphenylphosphato)silane. A tack-free product is obtained upon exposure to ambient moisture.

Example 34

To a reactor containing about 15.4 parts of diethyl hydrogen phosphate in about 30 parts toluene is added about 22 parts of methyltriacetoxysilane in about 100 parts of toluene. The reactants are heated to reflux temperature with agitation and maintained for about 2 hours and then cooled to room temperature. After evacuating the reactor for about 15 minutes, the reactants are again heated to reflux temperature and refluxed for an additional hour. The reactor is again evacuated and the solvent removed under a vacuum of <1 mm. Hg at 80° C. The residual product is analyzed and identified as methyl(diethylphosphato)diacetoxysilane.

To a reactor containing approximately 33.3 parts of a hydroxyl-terminated dimethylpolysiloxane having a viscosity of about 4,000 cs. is added about 3 parts of the methyl(diethylphosphato)diacetoxysilane prepared above. After heating the reactants to a temperature of about 80° C. for about 1 hour with agitation, the volatile materials are removed under vacuum. The residual product is transferred to a mold and exposed to ambient moisture and temperature. The material cured to a tack-fre condition in about 16 minutes.

Example 35

In accordance with the procedure described in Example 34, a grafted hydroxyl-terminated organopolysiloxane prepared in accordance with the procedure described in Example 18(a) is substituted for the hydroxyl-terminated dimethylpolysiloxane. The molded material cured to a tack-free condition in about 17 minutes.

Example 36

To a reactor containing approximately 30.8 parts of diethyl hydrogen phosphate in about 40 parts of benzene is added about 22 parts of methyltriacetoxysilane dissolved in about 80 parts of benzene. The reactants are heated to reflux temperature and refluxed for about 2 hours and then cooled to room temperature. The reactor is evacuated for about 15 minutes and then reheated to reflux temperature and refluxed for an additional hour. The reactor is evacuated and the solvent removed under vacuum of <1 mm. Hg at 80° C. The residual product is analyzed and identified as methylbis-(diethylphosphato)-acetoxysilane.

To a reactor containing approximately 33.3 parts of a hydroxyl-terminated dimethylpolysiloxane having a viscosity of about 4,000 cs. is added about 3 parts of methylbis-(diethylphosphato)acetoxysilane prepared above and heated to a temperature of about 80° C. for about 1 hour with agitation. The volatile materials are removed under vacuum and the residual product is transferred to a mold and exposed to atmospheric moisture. The product cured to a tack-free condition in about 5.25 hours.

Example 37

In accordance with the procedure described in Example 36, a grafted hydroxyl-terminated organopolysiloxane prepared in accordance with the procedure described in Example 18(a) is substituted for the hydroxyl-terminated dimethylpolysiloxane. A cured product is obtained in about 5.25 hours.

Example 38

In accordance with the procedure described in Example 36, approximately 2 parts of methylbis(diethylphosphato)acetoxysilane is added to a hydroxyl-terminated dimethylpolysiloxane having a viscosity of about 4,000 cs. The product cured to a tack-free condition in about 5.25 hours.

Example 39

In accordance with the procedure described in Example 36, approximately 1 part of methylbis(diethylphosphato)acetoxysilane is added to about 33.3 parts of a hydroxyl-terminated dimethylpolysiloxane having a viscosity of 4,000 cs. The product cured to a tack-free condition in about 5.16 hours.

When the above examples are repeated utilizing other organophosphato-silanes with hydroxyl-terminated organopolysiloxanes, elastomeric materials are obtained which have properties substantially equivalent to those of the specified examples.

Although specific examples of the invention have been described herein, other variations and modifications falling within the spirit and scope of the appended claims are to be included therein.

The invention claimed is:

1. A compound stable in the absence of moisture having the formula:

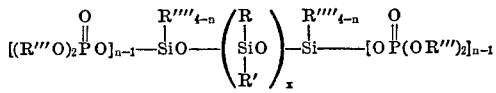

wherein R, R' and R''' are selected from the group consisting of monovalent hydrocarbon radicals, halogenated monovalent hydrocarbon radicals and cyanoalkyl radicals; R'''' is selected from the group consisting of hydrogen, monovalent hydrocarbon radicals, halogenated monovalent hydrocarbon radicals, cyanoalkyl radicals, hydrocarbonoxy radicals, aminooxy radicals, oximo radicals and monoacyl radicals of carboxylic acids; n is an integer greater than 2 and up to 4 and x is an integer of from 0 to 20,000.

2. A compound stable in the absence of moisture having the formula:

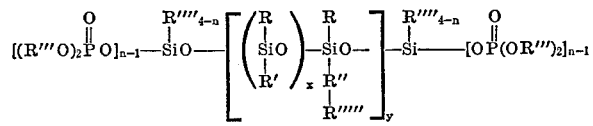

wherein R, R' and R''' are selected from the group consisting of monovalent hydrocarbon radicals, halogenated monovalent hydrocarbon radicals and cyanoalkyl radicals; R'' is selected from the group consisting of divalent hydrocarbon radicals, halogenated divalent radicals and divalent cyanoalkyl radicals; R'''' is selected from the group consisting of hydrogen, monovalent hydrocarbon radicals, halogenated monovalent hydrocarbon radicals, cyanoalkyl radicals, hydrocarbonoxy radicals, aminooxy radicals, oximo radicals and monoacyl radicals of carboxylic acids; R''''' is a polymeric group constituted of recurring units derived from olefins selected from the class consisting of branched and straight chained olefins of from 1 to 18 carbon atoms whether or not attached to an aromatic nucleus, halogenated olefins, again whether or not attached to an aromatic nucleus, unsaturated acids, esters of organic acids in which either the esterifying group or the derivative acid is unsaturated, unsaturated amides, and unsaturated nitriles; n is an integer greater than 2 and up to 4; x is an integer of from 0 to 20,000 and y is an integer of from 1 to 500.

3. The compound of claim 1 wherein R and R' are alkyl groups.

4. The compound of claim 1 wherein R''' is an alkyl group.

5. The compound of claim 1 wherein R'''' is an alkoxy group.

6. The compound of claim 2 wherein R and R' are alkyl groups.

7. The compound of claim 2 wherein R''' is an alkyl group.

8. The compound of claim 2 wherein R'''' is an alkoxy group.

9. The compound of claim 2 wherein R'' is an alkylene group.

10. The compound of claim 2 wherein R''''' is derived from at least 1 olefinic compound.

11. The compound of claim 2 wherein n is equal to 3.

12. The compound of claim 2 wherein R''''' is derived from at least 2 olefinic compounds.

13. The compound of claim 12 wherein R''''' is derived from a vinyl aromatic compound and an acrylate.

14. A composition which is curable at room temperature when exposed to moisture comprising an organopolysiloxane having terminal hydroxyl groups and a phosphatosilane of the formula:

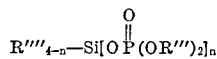

wherein $R'''$ is selected from the group consisting of monovalent hydrocarbon radicals, halogenated monovalent hydrocarbon radicals and cyanoalkyl radicals, $R''''$ is selected from the group consisting of hydrogen, monovalent hydrocarbon radicals, halogenated monovalent hydrocarbon radicals, cyanoalkyl radicals, hydrocarbonoxy radicals, aminooxy radicals, oximo radicals and monoacyl radicals of carboxylic acids and $n$ is an integer greater than 2 and up to 4.

15. The composition of claim 14 wherein the organopolysiloxane is represented by the formula:

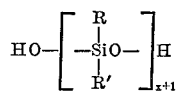

wherein R and R' are selected from the group consisting of monovalent hydrocarbon radicals, halogenated monovalent hydrocarbon radicals and cyanoalkyl radicals, and $x$ is an integer of from 0 to 20,000.

16. The composition of claim 14 wherein R and R' are lower alkyl radicals.

17. The composition of claim 14 wherein the organopolysiloxane is represented by the formula:

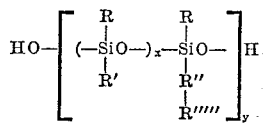

wherein R and R' are selected from the group consisting of monovalent hydrocarbon radicals, halogenated monovalent hydrocarbon radicals, cyanoalkyl radicals; R" is selected from the group consisting of divalent hydrocarbon radicals, halogenated divalent radicals and divalent cyanoalkyl radicals; $R''''$ is a polymeric group constituted of recurring units derived from olefins selected from the class consisting of branched and straight chained olefins of from 1 to 18 carbon atoms whether or not attached to an aromatic nucleus, halogenated olefins, again whether or not attached to an aromatic nucleus, unsaturated acids, esters of organic acids in which either the esterifying group or the derivative acid is unsaturated, unsaturated amides, and unsaturated nitriles; $x$ is an integer of from 0 to 20,000 and $y$ is an integer of from 1 to 500.

18. The composition of claim 17 wherein $R''''$ is derived from at least 2 olefinic compounds.

19. The composition of claim 17 wherein $R''''$ is derived from a vinyl aromatic compound and an acrylate.

20. A method for preparing a composition which is stable in the absence of moisture and which is curable at room temperature when exposed to moisture comprising reacting an organophosphatosilane of the formula:

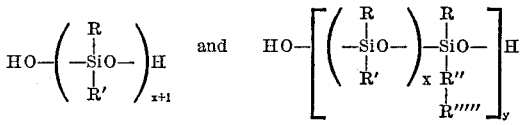

with an organopolysiloxane selected from the group consisting of $$HO-\left(\begin{array}{c}R\\|\\-SiO-\\|\\R'\end{array}\right)_{x+1}H \quad \text{and} \quad HO-\left[\left(\begin{array}{c}R\\|\\-SiO-\\|\\R'\end{array}\right)_x\begin{array}{c}R\\|\\-SiO-\\|\\R''\\|\\R''''\end{array}\right]_y H$$

wherein R, R' and R''' are selected from the group consisting of monovalent hydrocarbon radicals, halogenated monovalent hydrocarbon radicals and cyanoalkyl radicals; R" is selected from the group consisting of divalent hydrocarbon radicals, halogenated divalent radicals and divalent cyanoalkyl radicals; $R''''$ is selected from the group consisting of hydrogen, monovalent hydrocarbon radicals, halogenated monovalent hydrocarbon radicals, cyanoalkyl radicals, hydrocarbonoxy radicals, aminooxy radicals, oximo radicals and monoacyl radicals of carboxylic acids; $R'''''$ is a polymeric group constituted of recurring units derived from olefins selected from the class consisting of branched and straight chained olefins of from 1 to 18 carbon atoms whether or not attached to an aromatic nucleus, halogenated olefins, again whether or not attached to an aromatic nucleus, unsaturated acids, esters of organic acids in which either the esterifying group or the derivative acid is unsaturated, unsaturated amides, and unsaturated nitriles and $n$ is an integer of from 1 to 3; $x$ is an integer of from 0 to 20,000 and $y$ is an integer of from 1 to 500.

21. The method of claim 20 wherein the organophosphatosilane and organopolysiloxane are reacted in the presence of an inert organic solvent.

22. The method of claim 20 wherein the organophosphatosilane is prepared from the reaction of an organophosphate and an organotrihalosilane in the presence of an acid acceptor.

23. The method of claim 22 wherein the acid acceptor is selected from the group consisting of alkylamines and pyridine.

24. A compound of claim 1 wherein $R''''$ is an acyloxy group.

25. A compound of claim 2 wherein $R''''$ is an acyloxy group.

References Cited

UNITED STATES PATENTS

| | | |
|---|---|---|
| 2,842,515 | 7/1958 | Agens. |
| 2,978,471 | 4/1961 | Fekete. |
| 3,161,614 | 12/1964 | Brown et al. |
| 3,294,739 | 12/1966 | Weyenberg. |

DONALD E. CZAJA, *Primary Examiner.*

M. I. MARQUIS, *Assistant Examiner.*

U.S. Cl. X.R.

117—124, 135.1, 161; 260—18, 37, 448.2, 827

U.S. DEPARTMENT OF COMMERCE
PATENT OFFICE
Washington, D.C. 20231

UNITED STATES PATENT OFFICE
CERTIFICATE OF CORRECTION

Patent No. 3,441,537                      April 29, 1969

Guenther Fritz Lengnick

It is certified that error appears in the above identified patent and that said Letters Patent are hereby corrected as shown below:

Column 2, at the end of line 5, cancel "n 1" and insert -- n-1 --. Column 3, line 25, "methyl-tris(dihexylphosphato)silane should read -- methyl-tris(methylethylphosphato)silane --; after line 27, insert -- methyl-tris(butylhexylphosphato)silane --. Column 5, line 68, "alha" should read -- alpha --. Column 9, lines 6 and 7, "decyltris(dihexylphosphate)silane" should read -- decyltris(dihexylphosphato)silane --.

Signed and sealed this 16th day of February 1971.

(SEAL)
Attest:

Edward M. Fletcher, Jr.                    WILLIAM E. SCHUYLER, JR.
Attesting Officer                             Commissioner of Patents